(12) United States Patent
Krishnamurthy et al.

(10) Patent No.: US 8,819,109 B1
(45) Date of Patent: Aug. 26, 2014

(54) DATA NETWORK COMMUNICATION USING IDENTIFIERS MAPPABLE TO RESOURCE LOCATORS

(75) Inventors: Balachander Krishnamurthy, New York, NY (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 997 days.

(21) Appl. No.: 11/511,126

(22) Filed: Aug. 28, 2006

Related U.S. Application Data

(60) Provisional application No. 60/713,409, filed on Sep. 1, 2005.

(51) Int. Cl.
*G06F 15/16* (2006.01)
*G06Q 30/02* (2012.01)
*H04L 29/12* (2006.01)
*H04N 21/00* (2011.01)

(52) U.S. Cl.
CPC ............ *G06Q 30/02* (2013.01); *G06Q 30/0241* (2013.01); *H04L 61/30* (2013.01); *H04N 21/00* (2013.01)
USPC .......................................... 709/203; 709/219

(58) Field of Classification Search
CPC .... G06Q 30/02; G06Q 30/0241; H04L 61/30; H04N 21/00; H04N 2021/00
USPC ................................................... 709/203, 219
See application file for complete search history.

(56) References Cited

U.S. PATENT DOCUMENTS

| | | | |
|---|---|---|---|
| 6,963,915 B2 | 11/2005 | Karger et al. | |
| 7,089,319 B2 | 8/2006 | Lysenko et al. | |
| 2002/0112096 A1* | 8/2002 | Kaminsky et al. | 709/330 |
| 2002/0156911 A1 | 10/2002 | Croman et al. | |
| 2003/0001016 A1* | 1/2003 | Fraier et al. | 235/462.03 |
| 2003/0005152 A1* | 1/2003 | Diwan et al. | 709/239 |
| 2003/0046412 A1* | 3/2003 | Tsunoda et al. | 709/229 |
| 2003/0110130 A1* | 6/2003 | Pelletier | 705/50 |
| 2005/0021862 A1 | 1/2005 | Schroeder et al. | |
| 2006/0053109 A1* | 3/2006 | Sudanagunta et al. | 707/6 |
| 2006/0242201 A1* | 10/2006 | Cobb et al. | 707/104.1 |

* cited by examiner

*Primary Examiner* — Emmanuel L Moise
*Assistant Examiner* — Xiang Yu
(74) *Attorney, Agent, or Firm* — Akerman LLP; Michael K. Dixon; Roy P. Zachariah

(57) ABSTRACT

A technique for providing information via a data network is disclosed. A first server transmits an identifier to a client, where the identifier is mappable to a uniform resource locator (URL) associated with content stored on a second server. The client transmits the identifier to a second server. The second server maps the identifier to its associated URL, retrieves the content associated with the URL, and transmits the content to the client. Various types of mappings are disclosed, including encryption and predetermined mappings.

10 Claims, 4 Drawing Sheets

| IDENTIFIER | URL |
|---|---|
| 123XYZ | ADVERTISEMENT-1.HTML |
| XYZ45ABC | IMAGE-1.HTML |
| X2JF3X | ADVERTISEMENT-2.HTML |
| BY42722 | IMAGE-2.HTML |
| ⋮ | ⋮ |
| X2YB7ST2 | IMAGE-3.HTML |

US 8,819,109 B1

DATA NETWORK COMMUNICATION USING IDENTIFIERS MAPPABLE TO RESOURCE LOCATORS

This application claims the benefit of U.S. Provisional Application No. 60/713,409 filed Sep. 1, 2005, which is incorporated herein by reference.

BACKGROUND OF THE INVENTION

The present invention relates generally to data network communication, and more particularly to data network communication using identifiers mappable to resource locators.

Content delivery via data networks is becoming increasingly popular. One such data network, the Internet, has become a popular means for users to access information on various topics of interest. There are numerous content providers disseminating information via the Internet on various subjects. For example, there are content providers providing information on sports, news, finance, science, entertainment, etc. The content providers make this information available to users via websites, and end users access the information using web browsers. So-called "web surfing" of websites using an Internet browser is well known in the art.

In addition to the basic content, many websites also contain extraneous content, often in the form of advertising. From the content provider's perspective, advertising is desirable because it generates revenue for the content provider. Advertisers are willing to pay significant advertising fees to the more popular websites. However, from the end user's perspective, advertising is unnecessary (and often unwanted) information being displayed on the user's computer. In addition to merely being unnecessary or unwanted, advertising content may have deleterious effects on the user's web browsing experience. For example, advertising content often consists of graphics and animation, which uses bandwidth and may slow down the delivery of the desired content. Also, the complexity of some advertising content requires additional processing by the users web browser, which delays the display of the webpage at the user's computer.

A webpage may contain various types of advertising. One type is an inline advertisement in which the content provider inserts advertising content into the webpage. Another type of advertising is interstitial advertising, in which an advertisement page is shown before the actual requested content page. A user generally must view the interstitial page for a period of time before the requested content is delivered or displayed. Another type of advertising is called outsourced advertising, in which a webpage has a reference to a third party web server and the user's web browser requests and retrieves the advertisement from the third party web server. Regardless of the type of advertising, users generally may prefer to view content without such extraneous content.

There have been various attempts by users to block advertising from websites. One such attempt is the use of a browser plug-in to filter out advertising. A browser plug-in is additional software that may be installed on a computer that adds functionality to the basic browser. For example, the Firefox web browser has an available plug-in called Adblock. The Adblock plug-in allows a user to specify a set of pattern rules, each of which can either be a literal match along with the wildcard "*", or can be a full regular expression. The uniform resource locators (URLs) of all objects to be retrieved by the browser are compared against these rules and if a match occurs then the object is either not retrieved or not rendered by the browser. While a user of the Adblock plug-in may define his/her own rules for filtering, there has also been developed a set of rules (called Filterset.G) that may be shared among users. This large rule set has been developed by incorporating input from multiple users. The rule set is one large generic set of rules, which may be downloaded and used by users of the Adblock browser plug-in. U.S. patent application Ser. No. 11/409,123 entitled Data Network Content Filtering Using Categorized Parameters describes a technique for using categorized filtering parameters for filtering data network content rather than a large generic rule filter set.

As described above, many content providers derive a substantial amount of revenue from website advertising. As such, the increased use and effectiveness of techniques to block advertising content may result in reduced advertising revenues for the content providers. As such, there is a need for a technique for use by content providers to ensure that advertisements get delivered to users without being filtered out.

BRIEF SUMMARY OF THE INVENTION

In accordance with an embodiment of the invention, a first server transmits an identifier to a client, where the identifier is mappable to a uniform resource locator (URL) associated with content stored on a second server. Advantageously, the client is incapable of mapping the identifier to its associated URL. The client transmits the identifier to the second server. The second server maps the identifier to its associated URL, retrieves the content associated with the URL, and transmits the content to the client. Advantageously, the second server stores both content desired by the client and content undesired by the client. As such, the client cannot determine whether the content it is requesting from the second server is wanted or unwanted content. In this manner, the client computer cannot filter out unwanted content. This assures the content provider that the content will be displayed at the client computer (e.g., by a web browser).

Various types of mappings may be used, so long as the client cannot determine the mapping, or at least it is impractical for the client to determine the mapping. For example, the mapping may be an encryption function, where the first server and the second server share a key (or multiple keys) for encryption and decryption. Alternatively, the mapping may be some predetermined mapping between identifiers and URLs, where the mapping is shared between the first and second servers. The mapping may be modified periodically, so long as the mapping modifications are shared, or coordinated, between the first and second servers.

These and other advantages of the invention will be apparent to those of ordinary skill in the art by reference to the following detailed description and the accompanying drawings.

DETAILED DESCRIPTION

Figure 1:
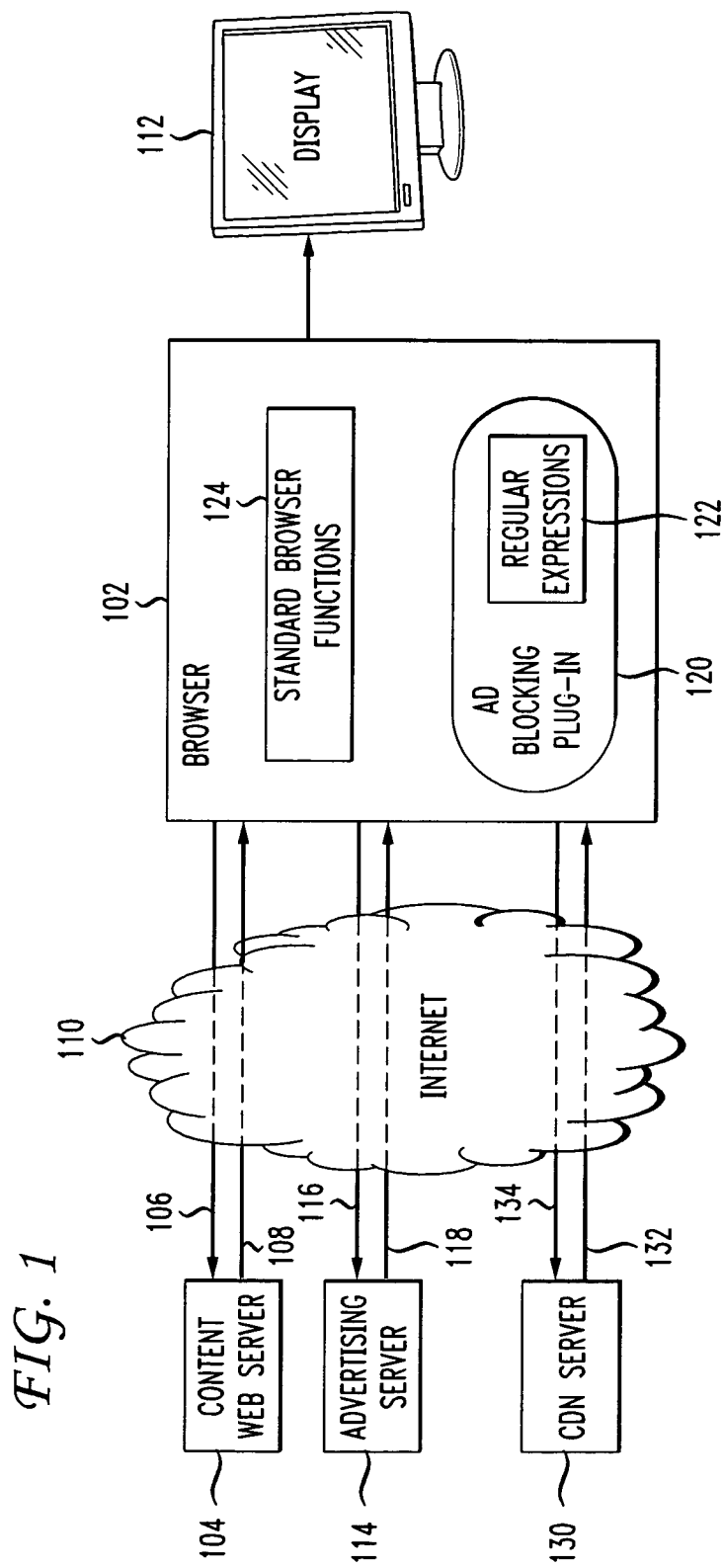
FIG. 1 represents a web browser filtering data network content.

FIG. 1 represents a web browser (which may be executing on a user computer) filtering data network content. The browser 102 may be any type of web browser capable of making requests for content and receiving content via a data network. For example, and without limitation, web browser 102 may be implemented using well known web browsers such as Microsoft Internet Explorer, Firefox or Netscape Navigator. As is well known, browser 102 acts as a client and sends requests 106 for content 108 to a content web server 104 via a data network 110, for example the Internet. The content web server 104 responds with the requested content 108. The browser 102 renders the received content and displays the rendered content on a computer display 112 for viewing by a user. This well known and standard browser functionality is represented generally in FIG. 1 as 124.

The request for information sent by a browser is generally in the form of a Uniform Resource Locator (URL) which identifies a web server and a particular web page stored on that server. For example, a URL may be: http://www.servername.com/webpage.html. The first part of the URL indicates the protocol. In the example, the protocol is the HyperText Transfer Protocol (HTTP). The URL then specifies the network address (e.g. Internet Protocol (IP) address) of the server. In the example, the network address is www.servername.com. The last part of the address specifies the particular webpage or other resources stored on the server. In the example, the resource is a web page (webpage.html). URL's, HTTP, and HTML (Hyper Text Markup Language) are all well known in the art and will not be described in further detail herein.

As is well known, as part of the HTTP protocol, received content may contain a URL reference to additional content which is to be retrieved by the browser 102. This content may be desired by the user (e.g., images), or it may be extraneous (e.g., advertising) content. For example, as shown in FIG. 1, the content 108 may contain a URL. Upon receipt of such a URL as part of content 108, the browser 102 will send another request via the Internet 110 to retrieve the referenced content. In one case, the additional content may be stored on another server. For example, if the additional content is advertising, then the reference may be to an advertising server 114. As shown in FIG. 1, upon receipt of the reference as part of content 108, the browser 102 will transmit another request 116 for the advertisement, and the advertising server 114 will deliver the advertisement 118 to the browser 102 for rendering and display on display 112. As another example, the additional content may be stored on a content delivery network (CDN) server. CDNs are becoming increasingly popular, and are networks of distributed servers that distribute content more efficiently on behalf of some content provider. For example, a popular news website may utilize the services of a CDN to distribute image, or other content, to end users.

As shown in FIG. 1, if the additional content is images to be distributed by the CDN, then the reference may be to a CDN server 130. As shown in FIG. 1, upon receipt of the reference as part of content 108, the browser 102 will transmit another request 134 for the additional content, and the CDN server 130 will deliver the additional content 132 to the browser 102 for rendering and display on display 112. As yet another alternative, additional content may reside on the original content server 104, in which case the reference to additional content will result in the browser 102 making another request (not shown) for the additional content to the content web server 104. Generally, advertising content is included in a web page as a URL reference to additional content requiring a separate request by the browser 102. This URL may reference the original content server, a dedicated advertising server, a CDN server, or other server.

Browser 102 supports the use of plug-ins. A plug-in is software which may be installed onto the user's computer that adds functionality to the basic browser. Browser 102 may include ad blocking plug-in 120 which is used to filter received content. Plug-in 120 may store regular expressions 122 to perform filtering on received content. A regular expression is a string that describes or matches a set of strings, according to certain syntax rules. A wildcard (e.g., "*") in a regular expression can be used to match any text. For example, the regular expression "http://www.advertisingserver.com/*" will match any text starting with "http://www.advertisingserver.com/" and could be used as a regular expression for ad blocking plug-in 120 to match URLs identifying any web page stored on the www.advertisingserver.com web server. Another example could be "http://www.contentserver.com/advertising/*" which will match any text starting with "http://www.contentserver.com/advertising/" and could be used as a regular expression for ad blocking plug-in 120 to match URLs identifying any web page stored on the www.contentserver.com web server within the "advertising" file directory. The uniform resource locators (URLs) of all objects to be retrieved by the browser are compared against these regular expressions and if a match occurs then the object is either not retrieved or not rendered by the browser. For example, as described above the content 108 received from content web server 104 may contain a reference (in the form of a URL) to advertising stored on advertising server 114. Upon receipt of the content at the browser 102, the ad blocking plug-in 120 will compare the reference URL against the filtering parameters 122. If there is a match, then either 1) the ad blocking plug-in 120 will cause the browser 102 to not request the advertising from the advertising server 114, or 2) the ad blocking plug-in 120 will allow the browser 102 to request (116) and receive (118) the advertising content from advertising server 114, but will block the rendering of the advertising content. In either alternative, the result is that the advertising content is not displayed on user display 112.

The goal of users is to define regular expressions that are tailored to filter out advertisements, without filtering out wanted content. The goal of advertisers is to ensure that all advertisements are rendered on the user's display. The present invention provides techniques for advertisers to ensure that advertisements are rendered on a user's display in view of these competing desires. In accordance with an embodiment of the invention, both wanted and unwanted content is stored on a web server, for example a content distribution network web server. When a client requests content from a content provider, the content provider responds with an identifier that is mappable to a URL stored on the content distribution network web server. The client cannot determine the URL from the identifier sent from the content provider. The client only knows that the content referred to by the identifier is stored at the CDN web server. The client transmits the identifier to the CDN server and the CDN server maps the identifier to the appropriate URL. The CDN then retrieves the content associated with the URL and transmits the content to the client for rendering by the browser. Since there is both wanted and unwanted content stored at the CDN server, and the actual URL cannot be determined by the client, the client cannot filter out unwanted (e.g., advertising) content based on the identifier. As will be discussed in further detail below, various mappings are possible.

Figure 2:
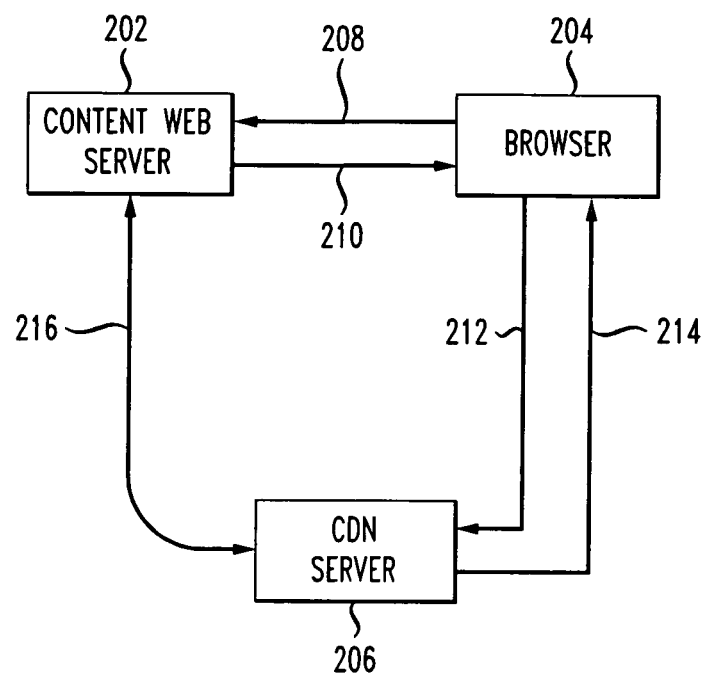
FIG. 2 shows a network block diagram.
Figure 3:
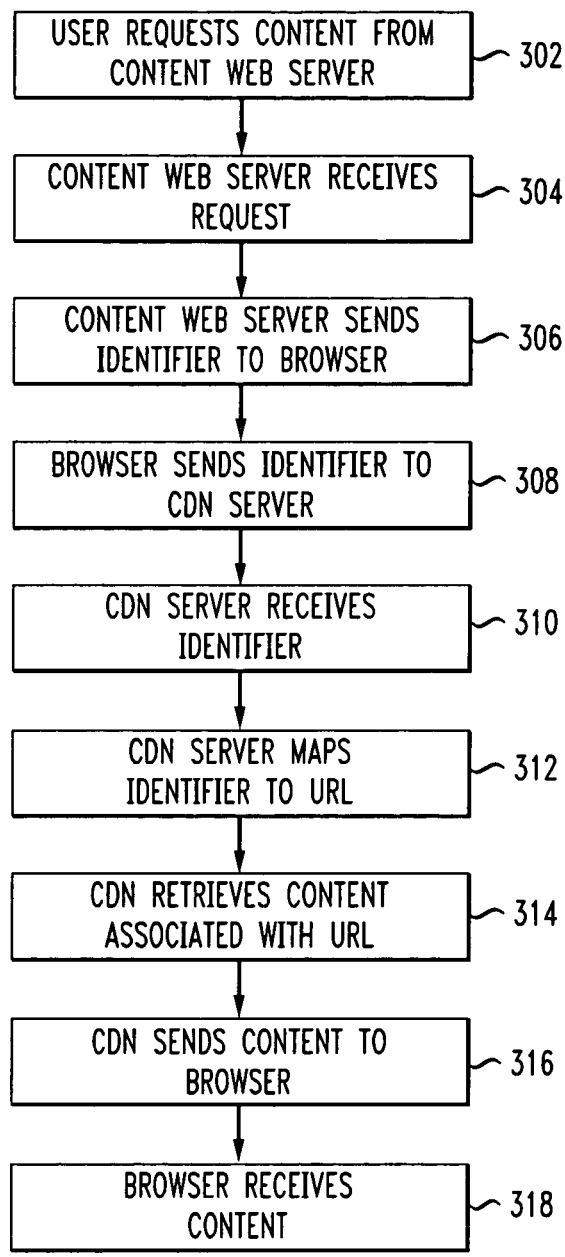
FIG. 3 is a flowchart of the steps of one embodiment of the invention.

The invention will be further described in conjunction with the network block diagram of FIG. 2 and the flowchart of FIG. 3. FIG. 2 shows a content web server 202 that stores content desired by users. The content provider associated with content web server 202 may employ the services of a CDN, so that additional content (e.g., images and/or advertising) is served by CDN servers, such as CDN server 206. FIG. 2 also shows browser 204, which may be any type of client browser, as described above. Referring now to FIG. 3, in step 302 a user of browser 204 sends a request 208 for content to content web server 202. That request is received by content web server 202 in step 304. In step 306 the content web server 202 sends a response 210 to browser 204. The response 210 may include various data, for example requested content. In accordance with an embodiment of the invention, the response will at least include an identifier that is mappable to a URL of additional content. The identifier may take on various forms. In one embodiment, the identifier may be of the form http://www.cdn-server.com/<identifier>. Thus, the identifier may be embedded in what is otherwise a legitimate URL, but instead of identifying the location of the file at the server, the response only includes an identification of the server and the identifier. This response identifies the CDN server 206 to the browser, but does not identify the actual URL of the file stored on the CDN server 206. So long as CDN server 206 is used to distribute both wanted and unwanted content, then the browser filtering software cannot determine whether this content is to be filtered out, because the browser 204 is incapable of mapping the identifier to the URL. Thus, upon receipt of the identifier in response 210, the browser 204 transmits the identifier to the CDN server 206 in request 212 in step 308. The CDN server 206 receives the request 212 in step 310.

In step 312 the CDN server 206 maps the received identifier with a URL. As will be discussed in further detail below, there are various mapping techniques that may be used in various embodiments of the invention. In each case, there is some mapping information that must be shared between the content web server 202 and the CDN server 206. This sharing of mapping information is represented in FIG. 2 as 216. Using the pre-shared mapping information, the CDN server 206 maps the identifier to a URL in step 312, and retrieves the content associated with that URL in step 314. In step 316 the CDN server 206 sends the retrieved content to browser 204 in response 214. The browser 204 receives the content in response 214 in step 318. The content is then rendered by the browser 204 and displayed to the user at the client computer in a well known manner.

In one embodiment, the mapping of identifiers to URLs is based on an encryption technique. For example, The content web server 202 could identify the following URL as an advertisement that is to be transmitted as part of a response to a user request:

http://www.cdn-server.com/advertisement-1.html

The content web server 202 then applies an encryption function E to the portion of the URL identifying the content (i.e., advertisement-1.html). The resulting URL is http://www.cdn-server.com/E (K,advertisement-1.html)

where K is the key used for the encryption. The encryption function E may be any well known encryption algorithm, for example DES, SHA, MD5, etc. Upon receipt of "http://www.cdn-server.com/E (K,advertisement-1.html)", the browser 204 will not be able to extract the "advertisement-1.html" portion of the URL, because it is encrypted and the browser does not have the key K. The browser 204 must send this information to the identified server (i.e., www.cdn-server.com). As described above, the CDN server 206 knows the key K, because this is the mapping information 216 shared between the content web server 202 and the CDN server 206. The CDN server 206 may then extract the full URL by decrypting the identifier using the key K, retrieve the content associated with advertisement-1.html, and send the content to the browser 204. One skilled in the art will recognize that the key may be a single key, or may be multiple keys, depending upon the type of encryption being implemented.

It is noted that the encryption function does not need to be a complex algorithm that places a large computational burden on the content web server 202 and the CDN server 206. Instead, the encryption function must only make it impractical for the browser 204 to decrypt the actual URL from the identifier. Thus, even a simple encryption algorithm, which is computationally very inexpensive if the key K is known, may be impractical to the browser 204 without the key. For example, a very simple encryption algorithm may be able to be broken without the key in 10 seconds by a conventional computer processor. However, even such a simple encryption would be impractical for browser 204 to break because most users would not be willing to endure even a delay of 10 seconds when browsing a web page.

Figures 4, 5:
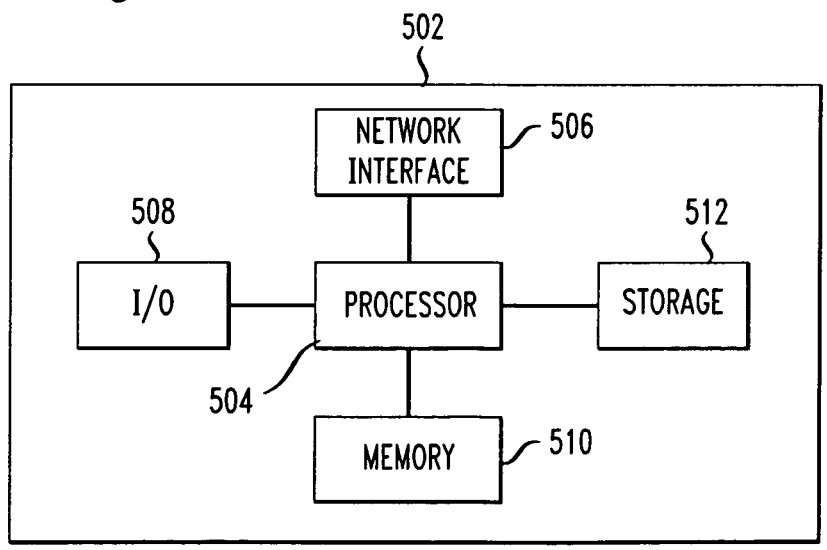
FIG. 4 shows a table mapping identifiers with URLs.
FIG. 5 is a high level block diagram of a computer.

Other mapping techniques may be used as well. For example, in one embodiment the mapping may be a predetermined mapping between identifiers and URLs. Such a mapping is illustrated in FIG. 4. FIG. 4 shows a table 400 with identifiers and their associated URLs. Thus, for example, record 402 of table 400 indicates that identifier 123xyz maps to URL advertisement-1.html. In accordance with an embodiment that uses a predetermined mapping as shown in FIG. 4, the content web server 202 and the CDN server 206 must share the predetermined mapping prior to operation. In order to prevent users from discovering the predetermined mapping over time, the predetermined mapping may change periodically. In one embodiment, the content web server 202 and the CDN server 206 may periodically exchange a new mapping, such as by exchanging mapping table 400. Periodic mapping changes could also include changes at random times to avoid timing attacks. Alternatively, the mappings within the pre-shared mapping table 400 may change according to some predetermined scheme (e.g., rotation) that is known to both the content web server 202 and the CDN server 206. Changing the mapping according to some predetermine scheme saves network bandwidth because content web server 202 and CDN server 206 do not need to transmit a new mapping table as often. In operation, if CDN wants to identify URL advertisement-1.html, it will perform a URL lookup in table 400, retrieve record 402, and determine that the URL advertisement-1.html is associated with identifier 123xyz. Content web server 202 will then include the identifier 123xyz to the browser 204. Upon receipt of the identifier 123xyz from the browser 204, the CDN server 206 will perform an identifier lookup in table 400, retrieve record 402, and determine that the identifier 123xyz is associated with URL advertisement-1.html.

As described above, the mapping scheme does not have to be computationally burdensome, it only needs to place an impractical computational burden on the browser 204 such that determining the mapping is impractical for the browser. So long as any delay caused by determining the mapping would be unacceptable to users browsing the internet, the mapping would be sufficient for the purposes of preventing any filtering by browsers. In this description, and in the claims, the term "incapable" is used to describe that the client cannot determine the URL from the identifier (i.e., the client does not know the mapping). It is to be understood that this term is not limited to the absolute sense that it is impossible for the client to perform the mapping (although the term is intended to encompass such impossibility), but includes the impractical sense, to mean that in a given implementation, the client cannot practically perform the mapping while still performing its intended function in a practical and acceptable manner.

The servers and browsers described herein may be implemented using appropriately programmed general purpose computers. Such computers are well known in the art, and may be implemented, for example, using well known computer processors, memory units, storage devices, computer software, and other components. A high level block diagram of such a computer is shown in FIG. 5. Computer 502 contains a processor 504 which controls the overall operation of computer 502 by executing computer program instructions which define such operation. The computer program instructions may be stored in a storage device 512 (e.g., magnetic disk) and loaded into memory 510 when execution of the computer program instructions is desired. Thus, the functioning of the computer will be defined by computer program instructions stored in memory 510 and/or storage 512 and the functioning will be controlled by processor 504 executing the computer program instructions. Computer 502 also includes one or more network interfaces 506 for communicating with other devices via a network. Computer 502 also includes input/output 508 which represents devices which allow for user interaction with the computer 502 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, one skilled in the art will recognize from the foregoing description that there are various other mapping techniques that may be used in accordance with various embodiments of the invention. Any type of mapping that obscures the actual URL would be sufficient to prevent URL filtering as described above. Further, the particular embodiment described above in connection with FIG. 2 shows a content web server 202 and a separate CDN server 206. However, various alternative architectures may be used in order to implement the principles of the present invention. For example, CDN server 206 may be any type of server, and not necessarily a server associated with a content distribution network.

The invention claimed is:

1. A method for providing information via a data network comprising:
   transmitting, by a content provider server to a client, a first uniform resource locator, the first uniform resource locator comprising an identification of a content delivery network server and a particular content identifier associated with particular content, wherein the particular content identifier is mappable to a second uniform resource locator identifying a location of the particular content stored on the content delivery network server based on a predetermined mapping exchanged between the content provider server and the content delivery network server, wherein the predetermined mapping is exchanged by exchanging a mapping table between the content provider server and the content delivery network server, wherein the predetermined mapping comprises a plurality of selected content identifiers and corresponding selected uniform resource locators, wherein each respective selected uniform resource locator locates content associated with a corresponding selected content identifier, wherein the predetermined mapping changes at random times, wherein the client is incapable of mapping the particular content identifier to the second uniform resource locator;
   applying an encryption function to the particular content identifier, wherein an unique key is utilized by the encryption function to perform an encryption to the particular content identifier;
   receiving, by the client, the first uniform resource locator from the content provider server, retrieving the particular content identifier from the first uniform resource locator, and transmitting the particular content identifier to the content delivery network server, wherein the client is unable to decrypt and extract the particular content based on the encryption function; and
   receiving, by the content delivery network server, the particular content identifier, mapping the particular content identifier to the second uniform resource locator based on the predetermined mapping, and transmitting the particular content to the client, wherein the particular content is rendered to the client despite the client utilizing a plug-in set to filter the particular content.

2. The method of claim 1 wherein the content provider server generates the particular content identifier by encrypting the second uniform resource locator.

3. The method of claim 2 wherein the content delivery network server maps the particular content identifier to the second uniform resource locator by decrypting the particular content identifier.

4. The method of claim 1 wherein the content provider server transmits the particular content identifier to the client in response to receipt of a request from the client.

5. The method of claim 1 wherein the content delivery network server stores both content wanted by the client and content unwanted by the client.

6. A server for providing information to client devices via a data network, the server comprising:
   a memory storing computer program instructions; and
   a processor communicatively coupled to the memory, wherein the processor executes the instructions to perform operations comprising:
   receiving identifiers from clients, the identifiers having originated from a content provider server different from the server;
   mapping the identifiers to uniform resource locators based on a predetermined mapping exchanged between the server and the content provider server, wherein the predetermined mapping is exchanged by exchanging a mapping table between the content provider server and the server, wherein the predetermined mapping comprises a plurality of content identifiers and corresponding uniform resource locators, wherein each respective content identifier identifies particular content and the corresponding uniform resource locator is associated with the particular content, wherein the predetermined mapping changes at random times, wherein the clients are incapable of mapping the plurality of content identifiers to the uniform resource locators;
   applying an encryption function to each of the plurality of content identifiers, wherein an unique key is utilized by the encryption function to perform an encryption to each of the plurality of content identifiers, wherein the clients are unable to decrypt and extract the particular content based on the encryption function; and transmitting content associated with the uniform resource locators to the clients, wherein the content includes the particular content, and wherein the particular content is rendered to the clients despite the clients utilizing plug-ins set to filter the particular content.

7. The server of claim 6 wherein the content identifiers comprise encrypted uniform resource locators.

8. The server of claim 7 wherein the operations further comprise:

mapping content identifiers to uniform resource locators by decrypting the content identifiers.

9. The server of claim 6 wherein the content comprises content wanted by the clients and content unwanted by the clients.

10. A method for providing information via a data network comprising:

receiving, at a content provider server, from a client, a request for particular content;

transmitting to the client, by the content provider server, in response to the request, a first uniform resource locator, the first uniform resource locator comprising an identification of a content delivery network server and a particular content identifier associated with the particular content, the particular content identifier mappable to a second uniform resource locator identifying a location of the particular content stored on the content delivery network server based on a predetermined mapping exchanged between the content provider server and the content delivery network server, wherein the predetermined mapping is exchanged by exchanging a mapping table between the content provider server and the content delivery network server, wherein the predetermined mapping comprises a plurality of selected content identifiers and a plurality of selected uniform resource locators, wherein each respective selected uniform resource locator locates content associated with a corresponding selected content identifier, wherein the predetermined mapping changes at random times, and wherein the client is incapable of mapping the particular content identifier to the second uniform resource locator; and applying an encryption function to the particular content identifier, wherein an unique key is utilized by the encryption function to perform the encryption to the particular content identifier, wherein the client is unable to decrypt and extract the particular content based on the encryption function, and wherein the particular content is rendered to the client despite the client utilizing a plug-in set to filter the particular content.

* * * * *